(12) United States Patent
Sykes et al.

(10) Patent No.: US 8,344,285 B2
(45) Date of Patent: Jan. 1, 2013

(54) PROCESS AND APPARATUS FOR ABLATION

(75) Inventors: Neil Sykes, Oxford (GB); Yoshinari Sasaki, Tokyo (JP); Hidehisa Murase, Tokyo (JP); Naoki Yamada, Tokyo (JP); Kousei Aso, Tokyo (JP)

(73) Assignees: Exitech Limited, Yamton, Oxford (GB); Sony Corporation, Shinagawa-Ku, Tokyo (JP)

( * ) Notice: Subject to any disclaimer, the term of this patent is extended or adjusted under 35 U.S.C. 154(b) by 1529 days.

(21) Appl. No.: 11/628,911

(22) PCT Filed: Jun. 13, 2005

(86) PCT No.: PCT/GB2005/002326
§ 371 (c)(1),
(2), (4) Date: Dec. 29, 2006

(87) PCT Pub. No.: WO2005/120763
PCT Pub. Date: Dec. 22, 2005

(65) Prior Publication Data
US 2008/0041832 A1 Feb. 21, 2008

(30) Foreign Application Priority Data
Jun. 11, 2004 (GB) .................................. 0413029.0

(51) Int. Cl.
*B23K 26/00* (2006.01)
(52) U.S. Cl. .......... 219/121.68; 219/121.84; 219/121.86
(58) Field of Classification Search ............. 219/121.68, 219/121.69, 121.84, 121.86, 121.82
See application file for complete search history.

(56) References Cited

U.S. PATENT DOCUMENTS
5,359,176 A * 10/1994 Balliet et al. ............. 219/121.84
(Continued)

FOREIGN PATENT DOCUMENTS
DE 39 23 829 1/1991
(Continued)

OTHER PUBLICATIONS
Clean Laser Machining (Industrial Laser Solutions, May 2003).

*Primary Examiner* — M. Alexandra Elve
(74) *Attorney, Agent, or Firm* — Davis & Bujold, PLLC

(57) ABSTRACT

The invention firstly comprises a method of ablation processing including a step of ablating a region of a substrate (1) by way of a laser beam (3) characterized by a further step of removing debris ablated from the region (1) by way of a flow of a fluid (7), namely a gas or vapour, a liquid or a combination of these, wherein the flow of fluid (7) is directed to flow over the region so as to entrap debris and thereafter to remove the entrapped debris from the region by directing the flow of fluid with any entrapped debris away from region along a predetermined path (6) avoiding subsequent deposition of entrapped debris on the substrate. The invention further comprises apparatus enabling a laser to ablate a region of a substrate characterized by a partially closed debris extraction module ('DEM') (4) located between a focusing or imaging lens (2) for a laser beam (3) and a region of a substrate (1), the DEM (4) having input (8) and output (6) ports by way of which a flow of a fluid (namely a gas or vapour, a liquid or a combination of these) is caused to flow over the region (1) so as to entrap debris ablated from the region and thereafter to remove the entrapped debris from the region by providing for the flow of fluid with entrapped debris to pass away from region along a predetermined path to prevent subsequent deposition of entrapped debris on the substrate.

15 Claims, 4 Drawing Sheets

U.S. PATENT DOCUMENTS

| | | | |
|---|---|---|---|
| 5,747,771 A * | 5/1998 | O'Neill | 219/121.84 |
| 5,922,225 A * | 7/1999 | Blake | 219/121.84 |
| 6,064,035 A * | 5/2000 | Toller et al. | 219/121.86 |
| 6,262,390 B1 * | 7/2001 | Goland et al. | 219/121.85 |
| 6,342,687 B1 | 1/2002 | Sukhman et al. | |
| 6,507,000 B2 * | 1/2003 | Otsubo et al. | 219/121.7 |
| 7,692,115 B2 * | 4/2010 | Sasaki et al. | 219/121.84 |
| 2002/0008087 A1 * | 1/2002 | Clauer et al. | 219/121.6 |
| 2002/0023907 A1 * | 2/2002 | Morishige | 219/121.85 |
| 2002/0179582 A1 | 12/2002 | Reichmann et al. | |
| 2003/0121896 A1 | 7/2003 | Yu | |
| 2003/0127435 A1 | 7/2003 | Voutsas | |
| 2004/0112882 A1 | 6/2004 | Miyairi et al. | |
| 2004/0226927 A1 * | 11/2004 | Morikazu et al. | 219/121.84 |
| 2006/0196852 A1 * | 9/2006 | Bann et al. | 219/121.8 |

FOREIGN PATENT DOCUMENTS

| | | |
|---|---|---|
| EP | 0 695 600 | 2/1996 |
| EP | 1 149 660 | 10/2001 |
| JP | 2003-245791 | 9/2003 |
| JP | 2004-098091 | 4/2004 |
| JP | 2004-160463 | 10/2004 |
| WO | WO 2004/087363 | 10/2004 |

* cited by examiner

PROCESS AND APPARATUS FOR ABLATION

This application is a national stage completion of PCT/GB2005/002326 filed Jun. 13, 2005 which claims priority from British Application Serial No. 0413029.0 filed Jun. 11, 2004.

TECHNICAL FIELD

This invention relates to a process of, and apparatus for, ablation providing for removal of a material from a workpiece by means of a pulsed laser beam and for control of debris in the form of particles and ablation products generated by the process. In particular it relates to the use of a laser for the deleting, scribing or removal of thin films of organic, inorganic or metallic material from large substrates used, by way of examples, for the manufacture of a flat panel display ('FPD') or solar panels and laser ablation of complex, dense 3-D structures into a surface of a large area sheet of polymer to create masters for the manufacture of lens arrays, diffusers and other devices for display units.

BACKGROUND ART

Structuring material by a direct process of ablation by pulsed laser beams is a well established technology used widely for the production of precision devices in, but not limited to, the medical, automotive, solar, display and semi conductor industries.

The ablation process involves the exposure of a material surface to one or more pulses of intense radiation generated by a pulsed laser source. If the laser wavelength is such that the radiation is strongly absorbed in the top layer of the material and the energy density high enough so that the absorbed energy raises the temperature of the top layer to well above the melting point of the material then in this case this top layer of material is decomposed and changed into gaseous, liquid or solid particle by-products that expand from the surface. The essential requirement for the process of ablation to occur is that enough energy is absorbed in the material in a sufficiently short time that the temperature is raised rapidly to a point such that the material decomposes.

For ablating thick materials each laser pulse removes between 50 nm and several microns of material depending on the energy density, laser wavelength and material absorption co-efficient. Each pulse behaves in the same way so that after a succession of pulses fractions of a millimeter of material can be removed. The ablated material is often converted to a gaseous material but in many cases can include both liquid and solid constituents.

For thin films of material the ablation process can be somewhat different. Where the film is deposited on top of a substrate made of a different material and the thickness of the film is low (e.g. less than 1 micron) it is possible for ablation to be undertaken by one of two methods. If the film absorbs the laser radiation strongly then no radiation penetrates to the lower substrate but is absorbed within the film. Such strong absorption in a thin layer causes the temperature of the film to rise rapidly and heat is conducted to the lower side where it causes the disruption of the bond between the film and the lower substrate. Such a process occurs with thin metal films. In this case the metal is removed in one laser pulse in the form of a mixture of particles and liquid.

In the case where the film is wholly or partially transparent to the laser radiation and the lower substrate absorbs the radiation more strongly than the film, the energy is absorbed at the top of the lower substrate at the interface between the two layers causing a rapid temperature rise and the ablation of the top layer. In this case the removed top layer is generally decomposed into particles ranging in size from sub micron to many tens of microns.

If the underlying substrate material is transparent to the laser radiation and the thin film absorbs it then it is sometimes advantageous to bring the laser beam to the substrate/film interface directly through the substrate. In such cases the film is often delaminated from the substrate in only one laser shot of modest energy density.

All processes of material ablation by laser lead to the generation of a range of ablation product components which can be in gaseous, liquid or solid form. These include atoms, molecules, clusters, particles, polymer chains, small and large material fragments, liquid droplets and jets and others. We refer hereafter to this material as ablation debris. The control of this ablation debris is a significant problem and the deposition of ablation debris onto the substrate surface has to be minimised to avoid contamination. In particular in the case of thin film ablation for FPD manufacture where the direct laser ablation process replaces a wet chemical or plasma etching process (in which particulate contamination does not readily occur) the re-deposition of ablation debris onto the surface of the substrate during a laser ablation FPD production process cannot be tolerated. It is an object of the present invention to control the flow of the ablation debris from the substrate surface and minimize it's re-deposition onto the substrate.

Methods have been used before to attempt to capture and control ablation debris generated during laser ablation processes. Most of these rely on some type of gas flow near the surface that is being ablated. The flow is often directed along the surface and can be created by blowing on one side of the area and sucking strongly from the other. The gas used is often air but in some cases other gases such as helium, oxygen or argon are used. In all cases the flow of gas is used to redirect the moving ablation debris and either direct it away from the critical area or preferably remove it totally from the substrate area. The process relies on momentum exchange between the gas molecules and the ablation debris and hence high pressures and high gas flow rates are needed for it to be effective. The use of a heavy gas such as argon can aid this process. If helium is used the effect is different as the mass of helium molecules is much less than of air molecules, and so helium is less effective than air in interacting with the ablation debris. In this case the moving ablation debris can then travel further from the ablation site before being slowed and deposited. This has the effect of moving the deposited material further from the site of origin but does not significantly reduce the total amount of material re-deposited.

The use of a reactive gas such as oxygen can reduce the amount of deposited material where the ablation debris reacts with the reactive gas to transform it to a pure gas. An example of this is the ablation of some polymer materials. Here the organic particles created can react with the oxygen to form pure gases such as carbon dioxide or carbon monoxide.

A liquid flow across a surface is sometimes used as an alternative to a gas flow to entrap ablation debris. During the laser ablation process a thin layer of water, or other liquid, is directed across the surface of the ablation region. The layer is required to be thin so that it does not absorb or disturb the incoming laser beam and is generally created by some type of atomizer nozzle located on one side of the ablation region. Such a system has been described recently in *Clean Laser Machining* (Industrial Laser Solutions, May 2003). Having passed across the substrate surface the fluid is collected in some type of channel around a chuck holding the substrate.

The methods listed above make use of unconstrained gas or liquid flows directed across a surface. Such usage is of limited effectiveness in removing the ablation debris since the capture of the debris is not totally effective and re-deposition in other areas of the substrate often occurs. Ablated debris is simply blown or flowed to another area of the substrate where it re-deposits. Another serious disadvantage of the liquid flow method is that it is inappropriate for dealing with large substrates associated with FPD manufacture since in this case a mounting chuck for the substrate can be very large and any water capture channels are a long way from the ablation point, As a result the re-deposition of ablation debris from the fluid flow onto the substrate is likely.

It is an object of the present invention to avoid these limitations and provide for removal of ablation debris from the surface of substrates of any size without significant re-deposition on the surface.

DISCLOSURE OF INVENTION

According to a first aspect of the present invention there is provided a method of ablation processing including a step of ablating a region of a substrate (1) by means of a laser beam (3) characterized by a further step of removing debris ablated from the region (1) by means of a flow of a fluid (7), namely a gas or vapour, a liquid or a combination of these, wherein the flow of fluid (7) is directed to flow over the region so as to entrap debris as aforesaid and thereafter to remove the entrapped debris from the region by directing the flow of fluid with any entrapped debris away from region along a predetermined path (6) avoiding subsequent deposition of entrapped debris on the substrate.

According to a first preferred version of the first aspect of the present invention the method of ablation is characterized in that the directed flow of fluid (7) is constituted by a gas.

According to a second preferred version of the first aspect of the present invention or of the first preferred version thereof the method of ablation is characterized in that the directed flow of fluid (7) is caused to flow substantially perpendicularly to the region.

According to a third preferred version of the first aspect of the present invention or of any preceding preferred version thereof the method of ablation is characterized in that the directed flow of fluid (7) is caused to flow transverse the region.

According to a second aspect of the present invention there is provided apparatus enabling a laser to ablate a region of a substrate characterized by a partially closed debris extraction module ('DEM') (4) located between a focusing or imaging lens (2) for a laser beam (3) and a region of a substrate (1), the DEM (4) having input (8) and output (6) ports by means of which a flow of a fluid (namely a gas or vapour, a liquid or a combination of these) is caused to flow over the region (1) so as to entrap debris ablated from the region and thereafter to remove the entrapped debris from the region by means providing for the flow of fluid with entrapped debris to pass away from region along a predetermined path to prevent subsequent deposition of entrapped debris on the substrate.

According to a first preferred version of the second aspect of the present invention the apparatus is characterized in that the directed flow of fluid (7) is constituted by a liquid.

According to a second preferred version of the second aspect of the present invention or of the first preferred version thereof the apparatus is characterized by means (4, 6) providing for the directed flow of fluid to flow substantially perpendicularly to the region.

According to a third preferred version of the second aspect of the present invention or of any preceding preferred version thereof the apparatus is characterized in that the DEM (4) is closed on a side near the lens (2) by a window (5) that is transparent to the laser beam (3). Typically the window (5) has a wiper means for removal of debris deposited on the window (5).

According to a fourth preferred version of the second aspect of the present invention or of any preceding preferred version thereof the apparatus is characterized in that the DEM (4) is closed on the side nearest the lens (2) by a plate (12) situated at the stop of the lens (2) that has a hole or an array of holes to allow the beam (13) to pass into the DEM (4) to the region (1).

According to a fifth preferred version of the second aspect of the present invention or of any preceding preferred version thereof the apparatus is characterized by the provision of a gap (G') between the DEM (4') and substrate (1) to allow the flow of fluid to enter the DEM (4') to flow over at least part of the region. Typically the DEM (4') is mounted on a movable slide and the gap provided at the lower edge (5) of the DEM (4') is maintained constant during substrate (1) movement by a suitable substrate surface position sensor linked to the slide.

According to a sixth preferred version of the second aspect of the present invention or of any preceding preferred version thereof the apparatus is characterized in that the DEM (4') is attached to an air puck that floats on the substrate (1).

According to a seventh preferred version of the second aspect of the present invention or of any preceding preferred version thereof the apparatus is characterized in that a flow of fluid through the DEM (4) is created by causing fluid to enter the DEM by means of a pump.

According to an eighth preferred version of the second aspect of the present invention or of any preceding preferred version thereof the apparatus is characterized in that a flow of fluid through the DEM (4) is created by extracting fluid from the DEM (4) by means of a pump.

According to a ninth preferred version of the second aspect of the present invention or of any preceding preferred version thereof the apparatus is characterized by a gas input port (8) is located in a region of the DEM (4) off-set from the region (1) to provide for a gas flow for the removal of debris deposited on the window.

The invention provides for substantial benefits in a number of aspects in the field of ablation. In the gas flow case we believe significant improvements in the efficiency of the ablation debris removal can be achieved if the gas flow is arranged so that it is directed substantially perpendicularly away from the substrate surface rather than across the surface. This can be achieved by directing a gas flow in an inwards direction across the surface all around the ablation site and sucking hard above the site. This can be put into practice by the construction of a suitable cell located to fill some part of the space between the substrate and the laser beam focusing or imaging lens used to expose the substrate. This cell is sealed at the top side by a window that is transparent to the laser beam and has its lower edge close to the surface of the substrate. The cell is attached to the device that holds the lens and hence the substrate can be moved freely below the cell. The cell is partially evacuated by means of a suction pump so that gas is sucked in through the gap close to the substrate. In this way a strong inwardly directed surface flow is converted into an upwards flow removing the ablation debris from the surface. If the flow is sufficiently intense most of the ablation debris components can be removed from the surface without any re-deposition. Hereinafter a cell of this general type is referred to as a Debris Extract Module ('DEM').

As well as a strong suction connection the DEM can have additional gas entry ports to aid the removal of debris from the substrate and to perform other functions such as prevention of debris depositing on the window at the top of the DEM.

Clearly many gases or vapours can be used within a DEM for both inward flow near the substrate and flow near the window but in many cases an appropriate gas to use for both convenience and cost reasons is air.

A critical aspect of the DEM design is that the distance between its lower edge and the substrate must remain constant at all times even when the substrate is moving laterally and the substrate may be uneven, in order to maintain constant gas flow conditions. Since the focusing or imaging lens also needs to remain a fixed distance from the substrate it is usual to attach the DEM to the same mounting mechanism as the lens so that both can track the surface of the uneven substrate during motion. Several mechanisms for holding the lens and DEM a constant distance from the top of the substrate exist including mechanical, optical, pneumatic, ultrasonic, capacitive and other sensor systems. If such devices are attached to the lower surface of the DEM and the DEM and lens attached to a servo motor driven slide then feedback of the sensor signal to the motor can be used to maintain the DEM lower edge and the lens distance from the substrate constant at all times.

Another method exists for holding the DEM (and lens) a constant distance from a substrate. This relies on the use of an air puck such as those described in our Patent Application PCT/GB2004/001432. In the present example the DEM and lens are attached to the top of an air puck that 'floats' on the substrate surface so maintaining a constant distance between them and the surface at all times.

This method has the key advantage that no separate height sensing device and servo controlled DEM and lens moving system are needed since the puck, DEM and lens assembly follow the substrate surface profile at all times as the air layer between the puck lower surface and the substrate maintains itself automatically at the same thickness to a high level of accuracy. Such a system is of course ideal for the processing of large area substrates for the manufacture of FPD devices where thickness variations of the glass substrate can vary by up to fractions of a mm.

In the simplest case of a DEM attached to an air puck the gas that enters the cell at the lower side to cause the upward flow past the ablation region and entrap the ablation debris is derived from the flow of air that is directed into the channels of the puck to create the air suspension layer. In this case the fraction of the air escaping in an inwards direction from the lower side of the hollow puck is sucked up by a strong extraction pump attached near the top of the DEM. Such a method is simple but may be limited in the volume of air that can move to the inside of the puck. This may lead to a less than effective upward flow of air so that the efficiency of the ablation debris extraction is limited.

To overcome this limitation it is proposed that ports are created in the air puck that can be used to direct additional air (or other gas) into the centre of the hollow puck. The ports are arranged to direct the flow radially inwards from the outside to the inside of the puck and are shaped so that the gas they emit to the interior of the puck is released very close to the substrate surface and is directed at a small angle to the surface. By this method the gas is caused to flow at high velocity in an inward direction along the surface towards the ablation zone. As the gas moves into the hollow core of the puck the suction applied to the DEM causes the flow to change from radially inwards to upwards so more effectively entrapping the upward moving ablation debris.

It has been found that debris generated by the ablation process can vary in amount and size and removal of some types may be made more effective by increasing gas flow for enhanced entrainment of debris. A DEM mounted on an air puck can have additional gas entry and exit ports to improve debris removal from the substrate and reduce re-deposition of debris on the DEM window. Ports can either deliver air or gas to the substrate by connection to a suitable pump or compressor or alternatively gas can be removed by way of a port connected to a suction pump.

The ports in the puck can be arranged to selectively direct the gas or air flow along the substrate surface in a direction parallel, obliquely or perpendicular to the substrate motion in a scanning process mode of operation. In situations where ablation debris removal efficiency is related to the direction of gas flow with respect to the moving substrate then this direction can be changed by opening and closing suitable valves to connect the ports alternately to input or extract flows. Alternatively the whole puck assembly can be rotated to align the ports correctly with respect to the substrate motion.

Various other proposed features of DEMs are now discussed. The laser window location can be at a variety of different positions. In some cases it may be beneficial to have the window at the top side of the DEM close to the underside of the lens so that the DEM almost fully occupies the space between the lens and the substrate. In other cases it may be beneficial to situate the window at an intermediate position between the lens and the substrate. The choice of position very often depends on the shape of the laser beam between the lens and the substrate. When the lens focuses the beam the beam size becomes very small close to the substrate so that positioning of the window well way from the substrate is important to avoid damage caused by the high laser power. On the other hand when the lens projects a large image and particularly when the lens is of telecentric type the position of the window can be close to the substrate surface without risk of damage by the laser beam.

To allow operation of the DEM for long periods without maintenance it is important to prevent deposition of ablation debris within the DEM. If such an effect occurs deposited debris may fall back onto the substrate. Preferably a DEM should therefore be designed so as to have smooth interior surfaces without steps, discontinuities or sudden size changes. Such a design of a DEM will allow for an unimpeded flow of gas and minimise the risk of debris deposition within the unit.

Despite these precautions, since the velocity of the gas flow is low close to the DEM walls, there still exits the possibility that some debris may be deposited from the gas flow onto the DEM walls. To prevent this material falling back onto the substrate the DEM is constructed in such a way that there are no direct paths for debris to follow from the DEM wall to the substrate. Such is achieved by the use of suitably designed inversely sloping surfaces or steps.

Since the laser beam has to pass through the window of the DEM it is important that the deposition of debris on the window is minimised. This is usually accomplished by correct flow of input gas close to the window but never the less some deposition may occur. In this case it is important to extend the operational lifetime of a DEM by arranging for the window to be movable so that contaminated parts of the window can be removed from the beam and replaced with clean areas. Such movements can be made manually or automatically.

A built in window cleaning system can be provided in order to extend the DEM lifetime. Such a system could be based on a type of moving wiper blade or consist of a static wiper blade across which the contaminated side of the window can be moved periodically. In yet another version a power- or manually-driven sequence of windows can be provided one being located to function as a working window while the remaining members of the sequence are cleaned.

In some cases where the diameter of the laser beam is small and the DEM fills a substantial part of the space between the lens and the substrate it is possible to replace the transparent window with an opaque plate with an aperture or hole. If the aperture is of moderate size oust larger than the beam size at the plate) and the suction applied to the DEM is sufficient, then an upward flow of gas near the substrate and at the same time a downward flow of gas through the aperture is created to ensure particulate debris is removed from the substrate and in addition does not reach the lens.

In this case where the lens is a projection lens and is non-telecentric then the laser beam forms a focus at a position between the lens and the substrate. This position is called the stop. In most cases the beam size at this stop point is small and hence a plate placed at this point to seal the top of the DEM needs only a small aperture. In this case the effect of this hole on the gas flow in the DEM is small.

If a multi-element lens system is used to homogenise the beam before the mask (or aperture) that is projected by the lens then the beam at the stop position is no longer a single focal spot but consists of an array of focal spots. The number of spots is equal to the number of what are conveniently described as 'beamlets' created by way of multi-element homogenization optics. Generally this number is in the range of a few to 100 or more but any practicable number of spots can be used. In this case the plate sealing the top of the DEM has an array of holes of appropriate size and spacing to allow all beamlets to pass through. The size of each of the holes needed depends on the divergence of the laser beam and the focal length of the lens but for most lasers is substantially less than 1 mm.

The case where the top of the DEM is sealed with the plate with an array of holes located at the stop position most frequently occurs when the laser is of multimode type such as an ultra-violet Excimer laser or a near Infra-red solid state laser. For these lasers beam homogenization systems involving segmentation of the beam into multiple beamlets to create a uniform pattern for projection is most commonly used.

In one case air or other gas admitted to a DEM and thereafter extracted from the DEM can be contained in a closed cycle flow loop system. In such a case it would be convenient to place a pump and filter unit in the flow loop to trap out the ablated particles. In other cases it may be more advisable to discharge the air or other gas sucked from the DEM freely rather than returning it to the DEM. In this case fresh gas or air is supplied to the DEM.

DEMs mounted on air pucks or by other methods to maintain their position can be operated in almost any orientation. It is possible to operate DEMs with the substrate vertical and the beam horizontal. Other orientations are possible including having the substrate at any intermediate angle between vertical and horizontal.

It is also possible to operate a DEM with the substrate horizontal and the beam directed vertically upwards from below. When the material to be ablated is deposited on a substrate that is transparent to the laser radiation the laser beam can irradiate the film through the substrate if appropriate. In this case the DEM can be situated on one side of the substrate while the laser beam is on the other. In the horizontal case the beam may come from the top and pass down through the substrate. The DEM is then below the substrate and captures debris ablated from the lower surface. Alternatively the beam may come up from below the substrate and to cause ablation from the upper side with resulting debris. In this latter case the DEM is on top. In both these cases the laser beam does not pass through the DEM so no window or perforated beam entry plate is needed.

Liquid Flow Utilisation

Here we propose an improvement arising from the use of a thin layer of liquid situated on the substrate. In this case this liquid is trapped between a window and the substrate at all times. The thickness of the liquid layer does not have to be thin and could fill the entire space between the substrate and the lens but it is expected that more effective trapping and removing of ablation debris will occur if the layer is rather thin in the range of a fraction of a mm up to 1 or 2 mm.

The window is attached to the same mounting arrangement as the lens and both are held at constant distance from the substrate by a servo motor driven slide activated by a suitable sensor device that detects the location of the top of the substrate. The gap between the substrate and the window thus remains constant at all times. The gap forms a cell or DEM through which liquid is passed to remove particles generated during the ablation process. The size of the DEM in the lateral directions is generally somewhat larger than the area occupied by the laser beam. For the case of an imaged beam the size may be up to 20 mm. For the case of a scanning optical system the size may be somewhat larger. The DEM shape can be circular, square, rectangular or any other shape that is appropriate and fits the beam shape at the substrate best.

Liquid is injected into the DEM on one side and extracted on the opposite side so that there is a flow of liquid across the DEM between the window and the substrate. The liquid traps the ablation debris and removes it from the ablation region.

Such a system is analogous to the methods proposed for optical immersion lithography where the gap between the imaging lens in a wafer stepper or scanner tool is filled with liquid to improve optical resolution and depth of focus. In this case the substrate is generally a resist coated wafer and the radiation pattern created by the lens on it exposes the resist which is subsequently developed to form a structure. In this case the light intensity is very low so no direct ablation of the resist occurs and hence no ablation debris is generated. In the worst case some gas is liberated during the exposure process. This is entrapped in the liquid and removed.

The invention we propose here is specifically for the case where the laser beam intensity is sufficiently high to directly ablate material and form ablation debris. Because of the containment of the liquid by the DEM window it is likely that this invention will not be appropriate where large pressures are generated during the ablation process. Such would be the case for high energy worst density irradiation of polymers. If a high pressure is created during the ablation process by gas formed then this is likely to disrupt the liquid flow and possibly damage the DEM window. Our invention is of particular importance in the case where thin layers of organic or inorganic materials are caused to be separated from a lower substrate at a modest or low energy density. In this case little or no gas is created and no pressure is generated and the liquid flow and cell are not perturbed. Such a situation arises when the thin layers of materials such as are found in FPDs are patterned by laser.

As the DEM window is close to the substrate clearly this liquid cell invention is not appropriate for the case where the beam is focussed and is of small size at the window. The invention is appropriate when the image size is relatively large and the energy density needed to ablate the thin layer of material is low.

It is possible to envisage a liquid DEM of the type described above where the window is attached directly to the lens and the window (and lens) float on the thin layer of liquid between the window and the substrate. This is analogous to the air puck and DEM discussed above but in this case the liquid cell performs both floating and DEM functions simultaneously.

Both gas and liquid version of the DEM inventions discussed above can be used with any type of laser system with wavelengths ranging from the far infrared (e.g. 10.6 μm) down to the deep ultra violet (e.g. 157 nm). The main requirement must be that the optical radiation must be able to pass through the window material without significant loss and that for the liquid case the liquid must be transparent to the laser radiation. It is generally expected that these inventions will be of most use where lasers in the wavelength range 193 nm to 1.06 μm are used. In this range fused silica is an ideal window material and water is an ideal liquid. In particular we expect many applications of the liquid DEM device to become important where a UV Excimer laser operating at 248 nm or 308 nm is used.

Both gas and liquid forms of the DEM can be operated with the DEM stationary with respect to the substrate or for the cases where there is relative motion. The stationary case would occur when laser processing is carried out in a step and repeat mode. The moving case will occur when the laser processing is in a scanning mode.

BRIEF DESCRIPTION OF DRAWINGS

Exemplary embodiments of the present invention will now be described with reference to the accompanying diagrams comprising FIGS. 1 to 10 which are diagrammatic views of DEMs.

MODES FOR CARRYING OUT THE INVENTION

Figure 1:
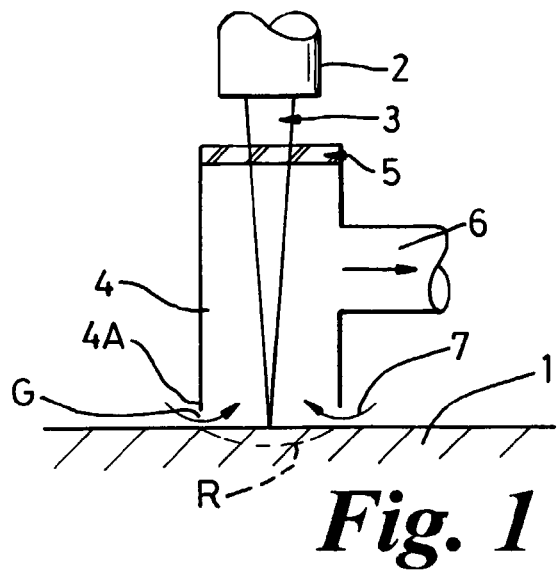

FIG. 1 A gas version of the DEM concept where the fluid flow used is air. A flat substrate 1 is irradiated by a laser beam 3 focussed or imaged by lens 2. The laser beam 3 passes through a DEM 4, that is closed at its upper end by a transparent window 5, and ablates substrate 1 in region R. Air, and any entrained debris created by the ablation process, is extracted from a port 6 some way up the DEM 4 and is replaced by incoming air 7 sucked through gap G between lower edge 4A of the DEM 4 and the substrate 1. The DEM 4 and lens 2 are maintained at constant position relative to the substrate 1 by a height sensor coupled to a servo motor driven slide mechanism (not shown).

Figure 2:
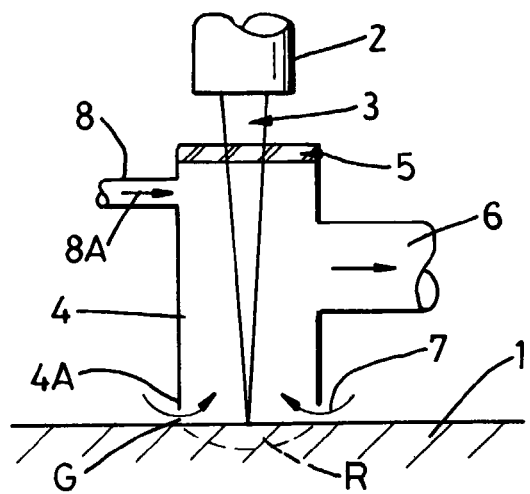

FIG. 2 A gas-using DEM 4 is provided with an additional port 8 is fitted to an upper region of the DEM 4 to provide for entry of gas to the interior. This additional port 8 provides for a cleaning flow of air 8A to be maintained over the underside of window 5.

Figure 3:
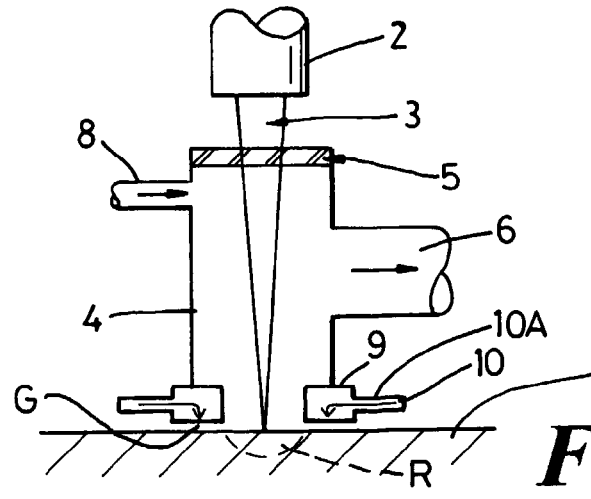

FIG. 3 A more complex form of a gas using DEM 4 is attached to an air puck 9 which is fed with air flow 10A through ports 10 to cause levitation of the puck 9 above the substrate 1 so as to maintain gap G at a predetermined height.

Figure 4:
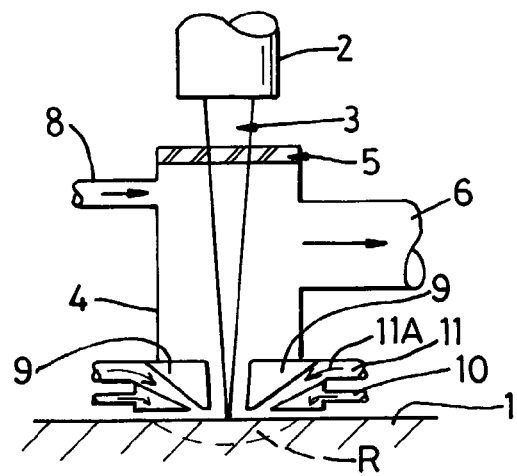

FIG. 4 An air flow DEM 4 is provided with special gas entry ports 11 to direct an additional air flow 11A into the interior of the puck 9, close to the ablation site R. The ports 11 serve to direct air flow 11A in an inward direction towards the ablation site R and to direct it at some appropriate small angle or as parallel as possible to the substrate surface. The ports 11 can be arranged on two or more sides of the puck 9 or can all around the puck 9.

Figure 5:
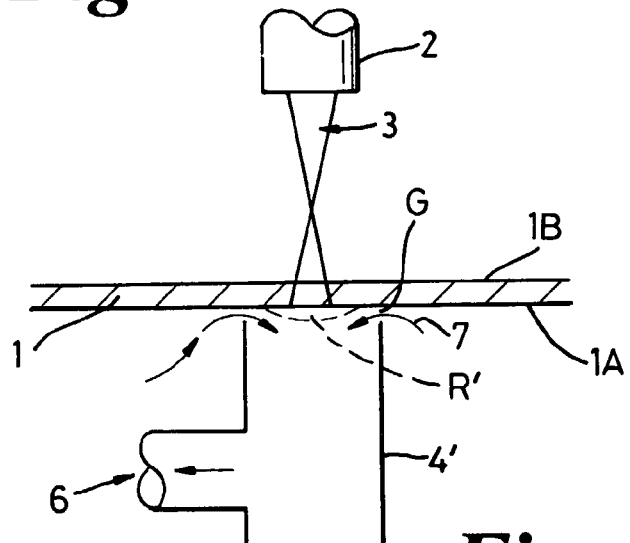

FIG. 5 A DEM 4' is for use with a substrate 1 which is transparent. Laser beam 3 passes through the substrate 1 to ablate material from region R' on the side 1A of the substrate 1 which is opposite to side 1B above which the lens 2 is located. In this case the DEM 4' does not need a laser window.

Figure 6:
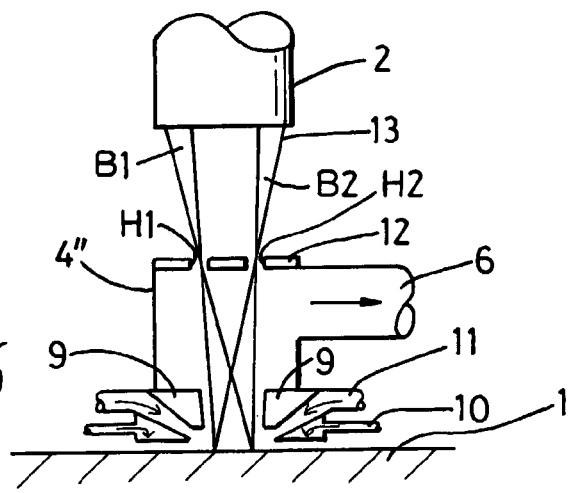

FIG. 6 A DEM 4" shows what in FIGS. 1 to 4 was described as a window replaced with a plate 12 with an array of holes (exemplified by holes H1, H2) each allowing a beamlet B1, B2 to enter the interior of the DEM 4". The plate 12 is situated at a lens stop where the beamlets 13 created by up-stream homogenizer optics are focused by a field lens to an array of focal spots. This is a situation occurring with a non-telecentric projection lens. Only two beamlets B1, B2 are shown in the FIG. 6 but the number of beamlets and focal spots at the stop can be up to over 100 depending on the number of lenses used in the homogenizer optics.

Figure 7:
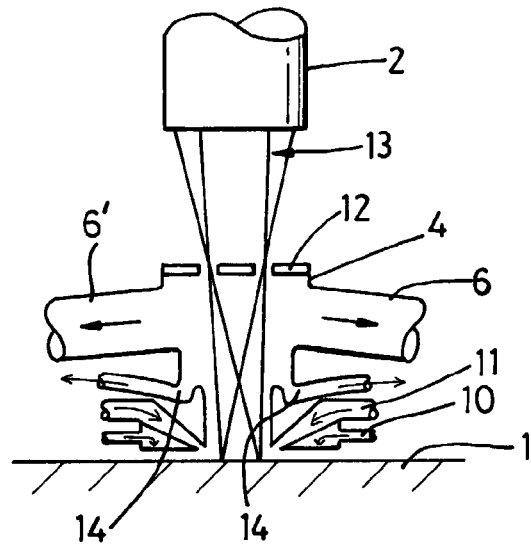

FIG. 7 A gas DEM 4 has an internal structure formed so as to minimize the possibility of debris that might be deposited on the walls of the DEM or fall back onto the surface of the substrate. Ports 6, 6' are arranged to slope downwards so once inside port 6, 6' debris is unlikely to move back towards the interior of the DEM 4. The diameter of the DEM 4 increases progressively from the bottom to the top with suitably pumped debris catcher channels 14 located appropriately to catch deposited debris that might become detached from walls of the DEM 4.

Figure 8:
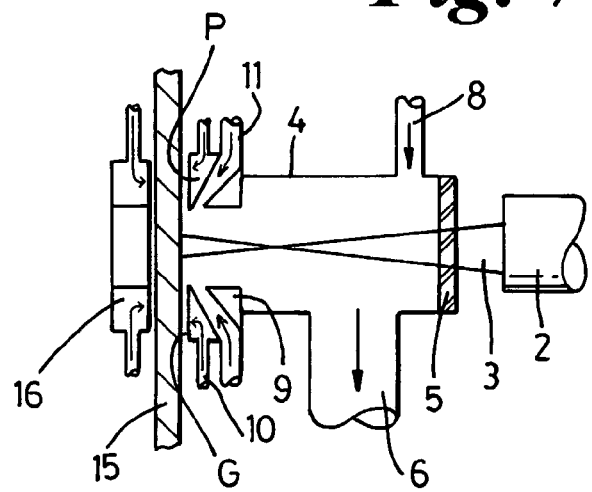

FIG. 8 A gas cell 4 is mounted on an air puck P for use where laser beam 3 is horizontal and substrate 15 is mounted vertically. In this case a second air puck 16 mounted at the rear side of the substrate is used to force the substrate 15 against the puck P on which the cell 4 is mounted to maintain gap G of constant size.

Figure 9:
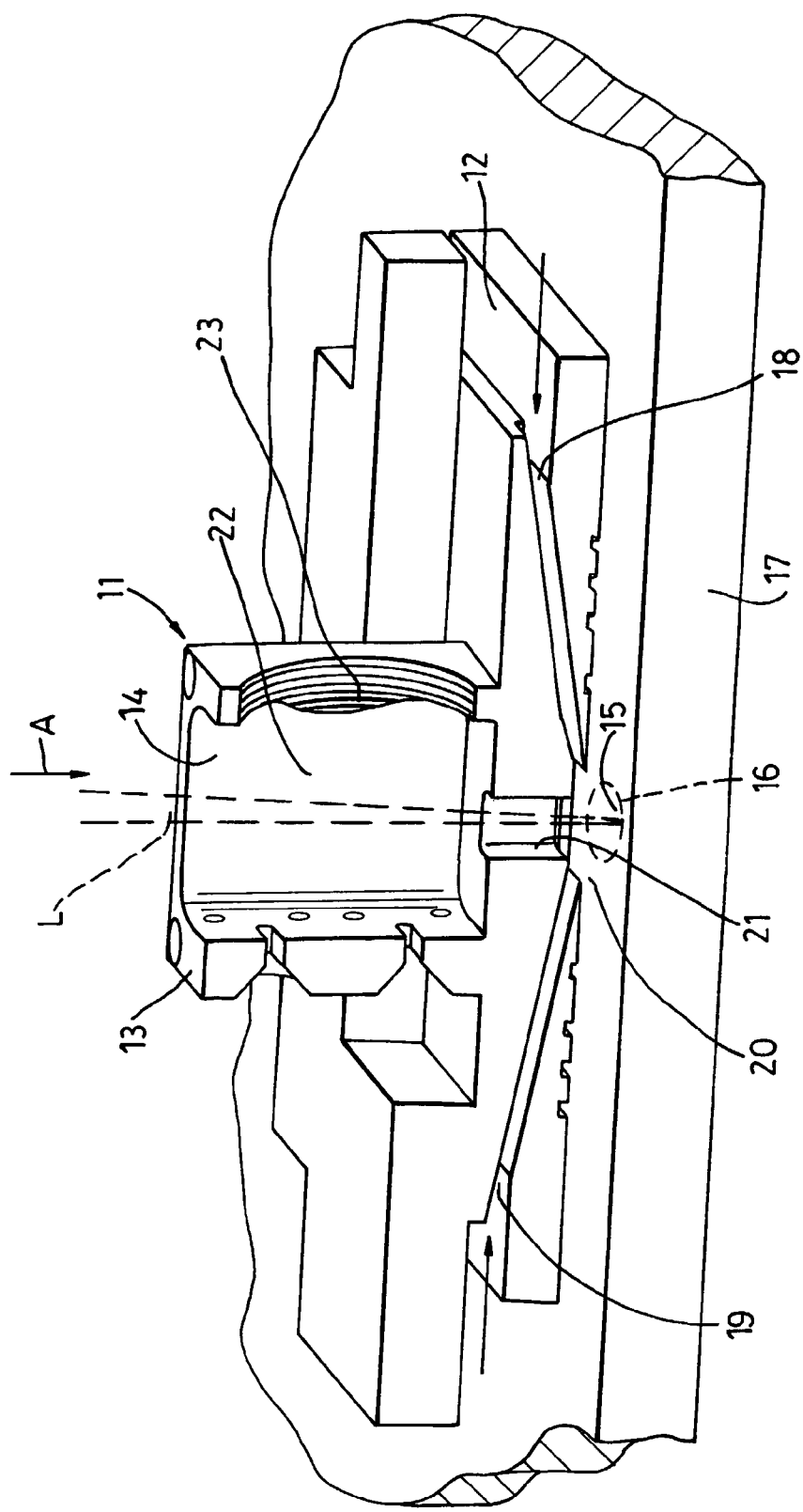

FIG. 9 This shows a DEM 11 integral with a puck 12. The DEM 11 incorporates a box 13 having at upper end 14 a window through which a laser beam L can be directed in the direction of arrow A through the DEM 11 and aperture 15 at region 16 of a substrate work-piece 17. Inlet ducts 18, 19 are provided in puck 12 to enable a gas (in this case air) to be directed into region 20 above that part of the region 16 which the laser beam L is currently ablating. The air flow is then caused to move perpendicularly from the region 20 with entrained debris up through duct 21 until it enters volume 22 and then passes out of the DEM by way of outlet port 23. The dimensions and proportions of the inlet ducts 18, 19, region 20, volume 22 and outlet port 23 are chosen to ensure that the air flow with the available pressure differentials act to provide for optimisation of the amount of debris removed. In this case ducts 18 and 19 provide for directing air flow into the region 20. However provision is made for flow in one of these ducts to be reversed to provide for an outflow along that duct from region 20. Further ducts comparable with inlet ducts 18, 19 are provided (though not shown) along an axis at right angles to an axis common to ducts 18, 19 so that four inlet ducts spaced at 90° intervals around a periphery of the region 20.

Figure 10:
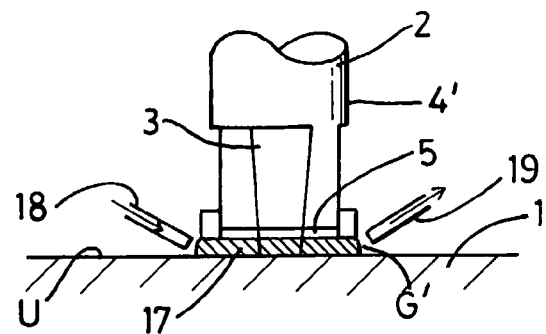

FIG. 10 A liquid flow DEM 4' is provided with a window 5 close to the substrate 1 and a layer of liquid 17 is trapped between the window 5 and upper surface U of substrate 1. The window 5 is attached to the same mechanism that retains lens 2. Both of these are caused to more in a controlled way with respect to the substrate surface U by means of a sensor and servo motor-driven slide device to maintain the spacing between the window 5 and the substrate surface U and the lens 2 and the substrate U constant. Liquid layer 17 is introduced into the gap G' between the window 5 and the substrate 1 by way of port 18 and extracted by way of port 19.

Industrial Applicability

The present invention provides method and apparatus by means of which laser ablation of a region on a work-piece can be readily and accurately carried out while debris arising from the ablation is positively removed from the vicinity of the region so as to avoid the debris being randomly deposited elsewhere on the work-piece.

The invention claimed is:

1. An apparatus enabling a laser to ablate a region of a substrate, the apparatus comprising:
   a partially closed debris extraction module (4) located between a focussing or imaging lens (2) for a laser beam (3) and a region of a substrate (1),
   the debris extraction module (4) having input (8) and output (6) ports by which a flow of a fluid is caused to flow over the region of the substrate (1) so as to entrap debris ablated from the region and thereafter to remove the entrapped debris from the region of the substrate (1) by providing for the flow of fluid, with entrapped debris, to pass away from the region of the substrate (1) along a predetermined path which prevents subsequent deposition of entrapped debris on the substrate, and wherein the flow of fluid is caused to flow in a closed loop,
   the debris extraction module (4') is attached to an air puck (9) that floats on the substrate (1),
   a plurality of ports being located on at least two sides of the air puck, and the plurality of ports being arranged for directing a flow radially inward, from an outside of the puck to an inside of the puck, toward the region of the substrate (1), and
   the fluid, on extraction from the debris extraction module, is re-circulated and returned to the debris extraction module in a closed loop via a pump and a filter.

2. The apparatus as claimed in claim 1, wherein the directed flow of fluid (7) is constituted by a liquid.

3. The apparatus as claimed in claim 1, wherein by means (4, 6) providing for the directed flow of fluid to flow substantially perpendicularly to the region.

4. The apparatus as claimed in claim 1, wherein the debris extraction module (4) comprises a window (5) which closes the debris extraction module (4) on a side near the lens (2), wherein the window (5) is transparent to the laser beam (3).

5. The apparatus as claimed in claim 4, wherein the window (5) has a wiping means for removal of debris deposited on the window (5).

6. The apparatus as claimed in claim 5, wherein further comprising a stationary wiper; wherein the window (5) can be moved over the stationary wiper to remove debris deposited on the window (5).

7. The apparatus as claimed in claim 1, wherein the debris extraction module (4) is closed on the side nearest the lens (2) by a plate (12) situated at a lens stop of the lens (2) where the beam (13) is focussed, wherein the plate (12) has a hole or an array of holes to allow the beam (13) to pass into the debris extraction module (4) to the region (1).

8. The apparatus as claimed in claim 1, wherein the provision of a gap (G') between the debris extraction module (4') and substrate (1) to allow the flow of fluid to enter the debris extraction module (4') to flow over at least part of the region.

9. The apparatus as claimed in claim 8, wherein the debris extraction module (4') is mounted on a movable slide and the gap provided at the lower edge (5) of the debris extraction module (4') is maintained constant during substrate (1) movement by a suitable substrate surface position sensor linked to the slide.

10. The apparatus as claimed in claim 1, wherein the apparatus comprises a pump for causing fluid to enter the debris extraction module, creating a flow of fluid through the debris extraction module (4).

11. The apparatus as claimed in claim 1, wherein the apparatus comprises a pump for extracting fluid from the debris extraction module (4), creating a flow of fluid through the debris extraction module (4).

12. The apparatus as claimed in claim 1, wherein a gas input port (8) is located in a region of the debris extraction module (4) off-set from the region (1) to provide for a gas flow for the removal of debris deposited on the window.

13. The apparatus as claimed in claim 1, wherein the or each input port provides for an incoming flow of fluid to be enabled to flow in an inward radial direction towards the region.

14. The apparatus as claimed in claim 1, wherein the interior of the debris extraction module is smooth and free of discontinuities affecting the flow of fluid.

15. An apparatus enabling a laser to ablate a region of a substrate comprising:
   a partially closed debris extraction module (4) located between the region of a substrate (1) and a focussing or imaging lens (2) for a laser beam (3),
   the region of the substrate (1) positioned exterior of the debris extraction module (4) during ablation,
   the debris extraction module (4) having input (8) and output (6) ports by which a flow of a fluid is caused to flow over the region of the substrate (1) so as to entrap debris ablated from the region of the substrate (1) and thereafter to remove the entrapped debris from the region of the substrate (1) by providing for the flow of fluid, with entrapped debris, to pass away from the region of the substrate (1) along a predetermined path which prevents subsequent deposition of entrapped debris on the substrate, and wherein the flow of fluid is caused to flow in a closed loop, and
   the fluid on extraction from the debris extraction module is re-circulated and returned to the debris extraction module in a closed loop via a pump and a filter, wherein the debris extraction module it attached to an air puck that floats on the substrate.

* * * * *